Nov. 14, 1961
B. W. BRUNSON
3,008,450
VACUUM OPERATING MECHANISM FOR A PUMPING
AND RELEASING SYSTEM
Filed April 17, 1958
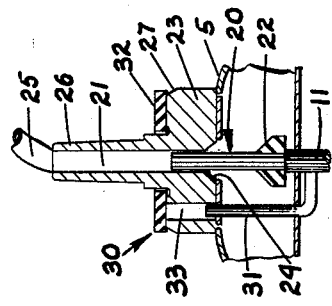
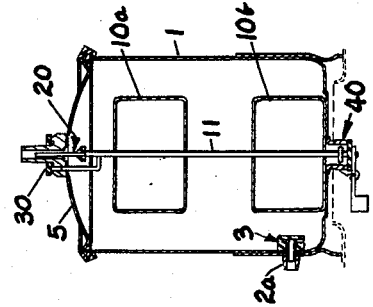
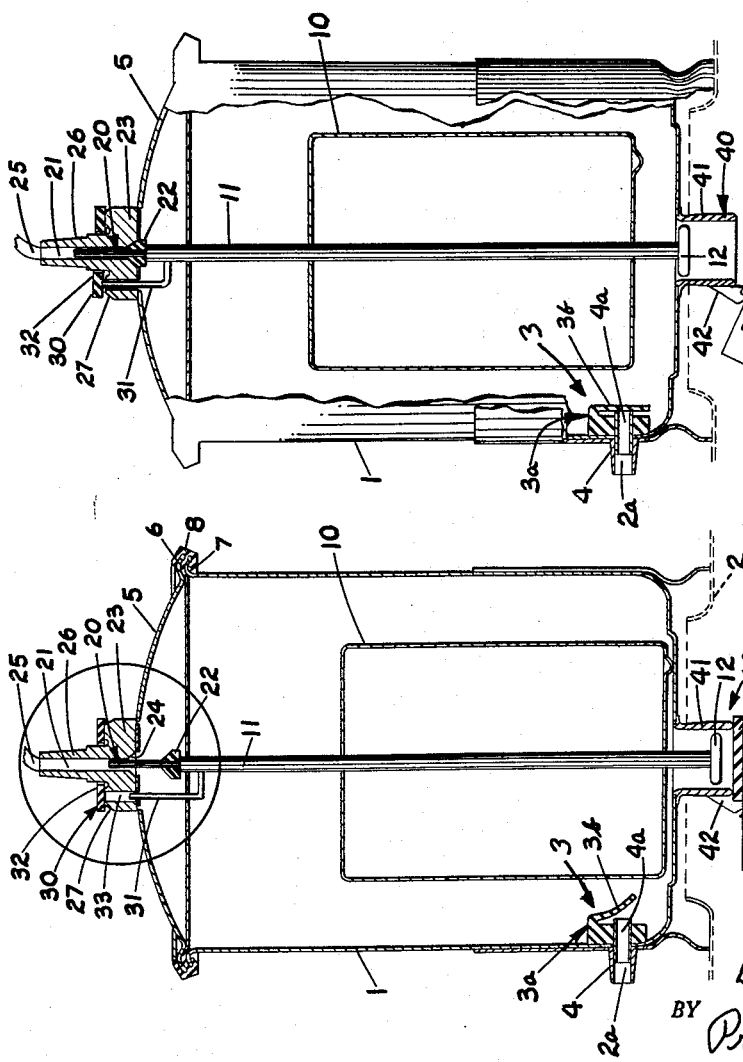
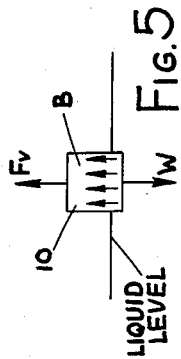
INVENTOR.
BRUCE W. BRUNSON
BY
Price and Heneveld
ATTORNEYS

United States Patent Office 3,008,450
Patented Nov. 14, 1961

3,008,450
VACUUM OPERATING MECHANISM FOR A PUMPING AND RELEASING SYSTEM
Bruce W. Brunson, Grand Rapids, Mich., assignor to Werner Machinery Company, Grand Rapids, Mich., a corporation of Michigan
Filed Apr. 17, 1958, Ser. No. 729,088
12 Claims. (Cl. 119—14.05)

This invention relates to a vacuum operating mechanism for a pumping and releasing system. More particularly, this invention relates to a means for automatically releasing liquid from a vacuum operated receiving tank when the incoming liquid reaches a certain height in the tank.

This invention is adapted to be especially useful in a milk conveying apparatus of the type wherein the milk is poured into a strainer at the situs of the milking operation and is automatically conveyed through a conduit system to the situs where the milk is preserved until shipment to the factory. This modernized method of handling the milk saves a great deal of time and energy for the workers and also aids in sanitary handling of the milk. Since a vacuum source is already available as an integral part of the milking apparatus, it is naturally expedient to utilize this same vacuum source for drawing the strained milk from the milking parlor to the milk house where the refrigerated bulk storage tank is located. However, the vacuum operated pumping and releasing systems now in existence have many inherent drawbacks which cause them to operate inefficiently when utilized for this purpose or under similar circumstances.

The apparatus now in existence comprise a receiving tank and an ordinary float valve which rises within the tank as the vacuum draws the liquid into the tank. The float is mounted on a rod which shuts off the vacuum when the liquid reaches a certain height. This causes the liquid to fall by gravity from the tank. These present structures are not satisfactory because they will not handle the liquid at a sufficient rate and various adjustments are required for different vacuum conditions.

It is therefore an object of this invention to provide a vacuum operating mechanism for a pumping and releasing system which can handle liquid at a greater rate.

Another object of this invention is to provide such a device which allows substantially all of the liquid to be dumped from the tank before vacuum is reestablished.

Another object of this invention is to provide a simple and effective means of subjecting the tank to atmospheric pressure as the vacuum is shut off.

A further object of this invention is to provide a pump and release mechanism requiring no adjustments for use under different vacuum conditions.

Another object of this invention is to provide such a device which is simple in construction and economical to manufacture.

Still another object of this invention is to provide a vacuum operated pumping and releasing mechanism which facilitates the effective use of the modern milk handling equipment described hereinbefore.

Other objects of this invention will become obvious to those skilled in the art of vacuum operated pumping and releasing mechanisms upon reading the accompanying specification and an examination of the accompanying drawings, wherein:

FIG. 1 is a side elevational, cross-sectional view of this invention with vacuum applied to the tank.

FIG. 2 is a side elevational, cross sectional view of this invention with the vacuum cutoff.

FIG. 3 is an enlarged, fragmentary, detailed view of the encircled fragment of FIG. 1.

FIG. 4 is a side elevational, cross-sectional view of a modification of this invention.

FIG. 5 is a schematic force diagram illustrating the principle of one aspect of this invention.

Briefly, this invention in its broadest aspect relates to a float valve means for automatically releasing liquid from a vacuum operated receiving tank when the incoming liquid reaches a certain height. The float is mounted on a member adapted to move vertically in the tank, and as the liquid moves the float and thus the member upwardly, the member is adapted to open a valve to the atmosphere and close a valve controlling the vacuum supply. The float is designed so that a substantial part of its buoyancy is needed to raise the member to a position shutting off the valve. Release means is provided so that when the float is raised to this position, the liquid is dumped from the tank. The buoyancy of the lower portion of the elongated float, which extends a substantial distance to the bottom of the tank, combined with the suction force on the valve member holds the valve closed until the liquid in the tank is substantially depleted.

A narrower aspect of this invention is a means for automatically closing the vacuum source from and subjecting it to atmospheric pressure.

Referring to the drawings, FIG. 1 shows a tank designated by the reference numeral 1. This tank is entirely closed off and is adapted to be subjected to vacuum pressure for drawing liquid into the tank. The valves 20 and 30 are mounted in the top of the tank for controlling the drawing of liquid into and dumping it from the tank. The valve 20 controls the vacuum supply and valve 30 the supply of atmospheric pressure. The liquid is dumped from the tank by a dump valve mechanism located at the bottom of the tank. The valves 20 and 30 are controlled by a novel type float which in combination with the valve mechanisms at the top of the tank constitute the inventive features of this invention.

The releaser tank is a mobile unit preferably of cylindrical shape adapted to be placed over a milk storage container 2 (shown in phantom) into which a liquid is dumped from the tank. The tank has inlet fitting 4 through which liquid passes to enter the tank. The fitting 4 has a tubular insert 4a extending into the tank and supporting a one-way check valve 3 which is constructed of a resilient material having a body 3a fitted over the insert and a flap 3b integral with the body 3a extending over the inside opening of the insert providing the check valve. The tank 1 has a cover 5 closing its top opening. The cover has an annular lip adapted to snap under the flange 7 of the top edge of the tank. The gasket 8 is provided to assure an effective seal between the cover and the tank.

Mounted at the bottom of the tank is the dump valve mechanism 40 including a nipple 41 extending from the bottom. Attached to this nipple is a bracket 42 a portion of which extends below the nipple and supports the dump valve. The dump valve is constructed of a bar 43 pivotally mounted on the bracket 42 and having a weight 44 at one end and a dump valve element or trap door 45 at the other end. The dump valve element 45 completely covers and seals the opening in the bottom of the nipple. The weight 44 normally overbalances the dump valve element 45 holding it tightly against sealing engagement with the bottom of the nipple 41. This especially occurs when the tank is subjected to a vacuum pressure. However, when the tank is subjected to atmospheric pressure and milk or other liquid is contained in the tank, the atmospheric pressure and the weight of the milk overbalances the weight 44 opening the trap door or dump valve element 45 and releases or dumps the milk. This operation will be described in more detail hereinafter under "Operation."

Since the dump valve is controlled entirely by whether vacuum or atmospheric pressure exists in the tank, it should be obvious that the valves 20 and 30 control the dumping or the actuation of the dump mechanism 40. FIG. 3 best shows the valves 20 and 30 which have a common valve body 23. The valve 20 includes the passageway 21 forming a valve seat 24 at its lower end. The top end of valve body 23 has a throat 26 through which the valve passageway 21 extends. This throat is connected to the vacuum supply line 25 providing communication between the vacuum supply line and the passageway 21. By this structure, so long as passageway 21 is unobstructed, tank 1 will be under vacuum pressure. Cooperating with the valve seat 24 is a valve head or element 22 adapted to seat on the valve seat and shut off the vacuum pressure source. When seated in the valve seat a suction force is exerted on the valve element 24 which force is utilized to effect the novel operation of this unit as will be described hereinafter. The position of this valve head is controlled by the float in accordance with the level of the liquid in the tank.

The valves 30 include the passageway 33 extending through the valve body 23 and providing communication between the atmosphere and the inside of the tank. Seated on the valve body 23 around throat 26 and over passageway 33 is a resilient valve ring 32. The ring as well as valve head 22 is preferably constructed of a material such as rubber or neoprene. This ring is seated on the top face of the cylindrical valve body 23 which has a chamfered edge 27 over which the outermost radial portion of the ring 32 extends or overhangs. The uppermost edge of the chamfer is located a very short distance from the passageways 33 providing only a very small area between the passageways and the chamfer. This construction permits the ring 32 to be more easily unseated or lifted. The upward or downward position of this valve ring determines whether the inside of the tank is subjected to atmospheric air. This position is controlled by an L-shaped finger 31 extending into one of the passageways 33 and attached to the end of the float rod. A single finger is provided so that as the ring 32 is lifted it is peeled from the top edge of the body 23 which also facilitates easier lifting or unseating of the ring.

The two valves 20 and 30 are controlled by the novel float actuating mechanism. The float 10 is elongated and rigidly mounted on the rod 11. Rod 11 is held and guided within the central portion of the tank by a small bar 12 attached to the rod and forming a T which fits into the nipple 41. The top end of rod 11 extends into the passageway 21 of valve 20. Thus, the rod is free to move vertically within the tank. It is very simple to remove for cleaning and easy replacement. The valve head 22, previously described, is rigidly mounted on rod 11 near its top above the float 10 as is the L-shaped finger 31 for actuating the valve ring 32. This finger 31 extends radially outwardly and then upwardly parallel to the rod, into passageway 33. In the upper position of the rod it engages the valve ring 32.

Referring more specifically to the float 10 itself, it should be understood that it is important to one broad aspect of this invention that the float is elongated and extends substantially down to the bottom of the tank 1. This position and shape of the float combined with its specific weight and buoyance in relation to the force exerted on the rod 11 by the valve construction 20 produces a construction which permits substantially all of the liquid in the tank to be dumped under varying vacuum conditions. I have found that if the float is made elongated the buoyance of the lower end combined with the vacuum or suction force exerted on the rod 11 by the valve head 22 is sufficient to hold the stem and float upwardly into dumping position until substantially all of the liquid has been dumped from the tank. This relationship of the vacuum force exerted on the rod, buoyance of the float, and the weight of the float, is illustrated by FIG. 5 wherein "$F_v$" indicates the suction force exerted by the vacuum source on the valve element 22. "B" represents the buoyance of the portion of the float in the liquid. "W" represents the weight of the float above the liquid. The ideal condition is to have the sum of the $F_v$ and B greater than the weight "W" which is represented by the following formula:

$$F_v + B > W$$

It should be understood that the above formula is for the ideal condition wherein the float does not drop until the level of the liquid is below it. Practically, the level of the liquid is slightly above the lower end of the float when the float drops.

Assembly and operation

This invention is very easily fabricated and assembled. The bracket 42 is attached to the nipple 41 at the bottom of the releaser tank, and bar 43 pivotally secured to the bracket, the bar having weight 44 at one end and a trap door 45 at the other sealing the opening in the bottom of the nipple. The elongated float 10 is rigidly mounted on rod 11, along with the T 12 on the bottom and the valve head 22 and finger 31 at the top as described hereinbefore. The valve body 23 is mounted in the cover 5 of the tank, it having the passageways 21 and 33 therein and ring 32 mounted therearound, one edge lying above passageway 33. The top of rod 11 slidably fits into passageway 21 and the finger 31 slidably fits into passageway 33. A liquid conduit 2a is connected to the fitting 4 of tank 1 and the vacuum source conduit 25 is connected to throat 26.

The operation is as follows. When the tank 1 is empty and the vacuum source is turned on, valve head 22 is unseated opening valve 20, and valve ring 32 is seated closing valve 30 (FIG. 1). This subjects tank 1 to vacuum pressure which draws liquid through fitting 4 and check valve 3. The elongated float does not immediately begin to rise because of its selected buoyance and weight thereby allowing plenty of the liquid to enter the tank. Liquid in the tank rises to a point slightly more than half way up the float before its buoyance causes it to rise. The float then rises and rod 11 moves vertically upward in passageway 21 causing finger 31 to move upwardly in passageway 33 and engage the ring 32 at its edge. The vacuum against valve 30 resists the rising of the float 10. The liquid continues to rise until the additional buoyancy of the float 10 overcomes the vacuum force on the valve 30 and the ring 32 is peeled upwardly. This causes the tank to be subjected to atmospheric pressure quickly and effectively. In the use of two fingers, one through two passageways 33, we found that at times the liquid reached a height sufficient for it to be drawn into the vacuum conduit. However, one finger as shown herein does not allow this to happen. When the ring 32 is peeled upwardly, the atmospheric pressure rushes into the tank through passageway 33. There is no longer a force tending to hold float 10 down and it will jump upwardly in the tank, causing valve head 22 to seat in valve seat 24 quickly and effectively, thereby shutting off the vacuum supply.

With valve 30 open and valve 20 closed, the weight of the liquid on the valve dump element 45 at the bottom of the nipple 41 easily overbalances the weight 44, pivoting the bar 43 and element 45 downwardly (FIG. 2) to dump the liquid from the bottom of the releaser tank into container 2. As the level of the liquid drops, the elongated float positioned on the bottom of the rod does not drop at the same liquid level at which it initially rose. Only when the liquid is almost entirely out of the tank will the float cease to buoy the rod 11 and valve head 22 in this position. This is very important, as the vacuum source is not reconnected to the tank 1 until substantially all of the liquid has escaped from the tank. As illustrated by FIG. 5 the buoyance of the float plus the vacuum holds the valve 20 closed until the liquid is near or below the bottom of the float.

It is now obvious that when valve 20 is opened due to the dropping of the float, valve 30 will be closed. Simultaneously the weight 44 causes the door 45 to swing back to closed position in the bottom of nipple 41 as the pressure in tank 1 is reduced. Liquid is once again drawn into the tank through fitting 4 and the cycle is repeated.

This invention provides a simple and inexpensive vacuum operating pumping and releasing system. The system works smoothly and effectively and substantially all of the liquid is dumped when the vacuum is shut off. The means to subject the tank to atmospheric pressure during each cycle is simple, effective, and does not need adjustment if the vacuum pressure varies. These features means that a much greater volume of liquid passes through the system in a given time. It is readily apparent that this system is especially advantageous when used in conjunction with modern milking equipment. It not only handles and conveys the milk quickly and evenly, its simple construction makes it very easy to clean and keep sanitary. Also, no adjustments are needed for different vacuum conditions.

Modifications

FIG. 4 shows a modification of this invention. All of the elements are the same except the structure of the elongated float 10. Rather than a single elongated float, two floats 10a and 10b are affixed on rod 11. The float 10a is mounted near the bottom of the tank and float 10b is mounted above it on rod 11. It will be noted that these floats function in the same manner as a single elongated float and in effect constitute a double chambered float assembly with the chambers 10a and 10b spaced apart. The incoming liquid will rise above the bottom float without causing rod 11 to rise within the tank. However, the added buoyancy of the top float will cause the rod to rise and valve 20 is thereby closed and valve 30 is opened. As the liquid is dumped from the tank the suction force applied by the vacuum source on the valve seat 24 plus the buoyance of the bottom float will keep the valve 20 closed until the liquid is substantially out of the tank. Only then will the weight of the floats be sufficient to overcome the buoyance of the bottom float plus the suction on valve seat 24. It should thus be noted that a plurality of floats, operating on the principles of one elongated float does not depart from the spirit and scope of this invention.

It must be understood that while I have described only certain embodiments of this invention, certain other embodiments might be utilized without departing from the spirit and scope of the invention. These other embodiments are included unless the accompanying claims expressly state otherwise.

I claim:

1. In a means for automatically releasing liquid from a vacuum operated receiving tank having a vacuum opening subjected to a pressure less than atmosphere and a vent opening vented to atmosphere, said vacuum opening defining a valve seat; a valve means for closing said vent opening; when the incoming liquid reaches a certain height: a tank; a vertically movable member mounted in said tank; an elongated float means in said tank; said float means affixed on said member; said member having a valve element arranged to engage and disengage said valve seat to thereby open said vacuum opening in one position of said float and to close the vacuum opening in a second position of said float; said member also having an actuator attached thereto for holding the valve means of said vent open when said float is in said second position; said valve element when in seated position on said valve seat being subject to a vacuum force holding it thereon; the weight of said float, member and valve element being slightly less but substantially equal to the weight of a quantity of milk having a volume equal to the volume of said float whereby the rising of the milk to the upper portion of the float is required to buoy said float and raise said member to said second position; means to allow the liquid to drop from the tank when said member is in said closed position; and the buoyance of the lower portion of said float combined with said lifting force of said valve element being such that said member is held in said closed position generally until said liquid drops to a predetermined position near the lower portion of said float.

2. In a means for automatically releasing liquid from a vacuum operated receiving tank when the incoming liquid reaches a certain height: a tank having a vacuum opening subjected to a pressure less than atmosphere and a vent opening vented to atmosphere, said vacuum opening defining a valve seat; a valve means for closing said vent opening; a vertically movable member mounted in said tank; float means in said tank; said float means affixed on said member and having upper and lower portions the extremities of which are spaced a substantial distance along the depth of said tank; said member having a valve element arranged to engage and disengage said valve seat to thereby open said vacuum opening in one position of said float and to close the vacuum opening in a second position of said float; said member also having an actuator attached thereto for holding the valve means of said vent open when said float is in said second position; said valve element when in seated position on said valve seat being subjected to a vacuum force holding it thereon; the weight of said float, member and valve element being slightly less but substantially equal to the weight of a quantity of milk having a volume equal to the volume of said float whereby the rising of the milk to the upper portion of the float is required to buoy said float and raise said member to said second position; means to allow the liquid to drop from the tank when said member is in said second position; and the combined forces of the buoyance of the lower portion of said float with said vacuum force on said valve element being slightly less than but substantially equal to the weight of said float whereby said member is held in said second position generally until said liquid drops to a predetermined position near the lower portion of said float.

3. Structure as defined in claim 2, said member having a finger mounted generally near its top lying generally parallel to said member; said valve means including a ring lying above a small opening near its outer edge; said finger having a diameter smaller than said opening and projecting through said opening into lifting contact with the outer edge of said ring as the float rises to said second position and as the vacuum opening is closed thereby peeling the edge of said ring away from said opening and subjecting the tank to atmospheric pressure, and hastening the release of the liquid from the tank.

4. In a means for automatically releasing liquid from a vacuum operated receiving tank when the incoming liquid reaches a certain height: a tank having a vacuum opening subjected to a pressure less than atmosphere and a vent opening vented to atmosphere, said vacuum opening defining a valve seat; a valve means for closing said vent opening; a vertically movable rod mounted in said tank; a float positioned vertically within said tank and having upper and lower portions the extremities of which are spaced a substantial distance along the depth of said tank; said float affixed on said rod; a valve element mounted generally near the top of the rod, said valve element arranged to engage and disengage said valve seat to thereby open said vacuum opening in one position of said float and to close the vacuum opening in a second position of said float; said rod also having an actuator attached thereto for holding the valve means of said vent open when said float is in said second position; said valve element when in seated position on said valve seat being subject to a vacuum force holding it thereon; a depending nipple formed in the bottom of the tank; said vacuum opening and said nipple slidably receiving the ends of said rod; said float having a weight slightly less but substantially equal to the weight of a quantity of milk having a volume equal to the volume of said float whereby the rising of the milk to the upper portion of the float is required to move said rod upwardly to said closed position; means mounted on the bottom of said nipple to allow the liquid to drop from the tank under force of gravity when said valve is shut off; and the forces created by the buoyance of the lower portion of said float combined with said vacuum holding force of said valve element being slightly less than but substantially equal to the weight of said float, member and valve element whereby said rod is held in position closing said valve until said liquid drops to a predetermined position near the lower portion of said float.

5. Structure as described in claim 4, said rod having a finger mounted generally near its top lying generally parallel to said member; said valve means including a ring lying above a small opening near its outer edge; said finger having a diameter smaller than said opening and projecting through said opening into lifting contact with said outer edge of said ring as the float rises to said second position and as the vacuum opening is closed, thereby peeling the edge of said ring away from said opening and subjecting the tank to atmospheric pressure, and hastening the release of the liquid from the tank.

6. Structure as described in claim 2 in which the float means comprises a plurality of floats spaced at different heights along said vertically movable member.

7. Structure as described in claim 2 in which the float means comprises a single elongated float mounted on said vertically movable member.

8. Structure as described in claim 4 in which the float means comprises a plurality of floats spaced at different heights along said vertically movable member.

9. Structure as described in claim 4 in which the float means comprises a single elongated float mounted on said vertically movable member.

10. Structure as defined in claim 8, said rod having a finger mounted generally near its top lying generally parallel to said member; said finger adapted to open a second valve mounted generally near the top of the tank, said second valve including a ring lying above a small opening near its outer edge; said finger having a diameter smaller than said opening and projecting through said opening into lifting contact with the outer edge of said ring as the float rises to said second position and as the vacuum opening is closed, thereby peeling the edge of said ring away from said opening and subjecting the tank to atmospheric pressure, and hastening the release of the liquid from the tank.

11. In a means for automatically releasing liquid from a vacuum operated receiving tank when the incoming liquid reaches a certain height; a tank; a vertically movable member within said tank; a float mounted on said member; said member having a valve element to shut off the vacuum supply when in closed position; said member having a finger mounted generally near its top lying generally parallel to said member; said finger opening a second valve mounted generally near the top of the tank, said second valve including a ring lying above a small opening near its outer edge; said finger having a diameter smaller than said opening and projecting through said opening into lifting contact with the outer edge of said ring as the vacuum supply is shut off, thereby peeling the edge of said ring away from said opening and subjecting the tank to atmospheric pressure, and hastening the release of the liquid from the tank.

12. In a means for automatically releasing liquid from a vacuum operated receiving tank when the incoming liquid reaches a certain height; a tank; a vertically movable member within said tank; a float mounted on said member; said member having a valve element to shut off the vacuum supply when in closed position; a second valve mounted generally near the top of the tank; said member having a finger opening said second valve; said second valve including a resilient flap having an edge portion lying above a small opening; said finger having a diameter less than said opening and projecting through said opening into lifting contact with the outer edge as the float rises and as the vacuum supply is shut off, thereby peeling the edge of said element away from said opening and subjecting the tank to atmospheric pressure, and hastening the release of the liquid from the tank.

References Cited in the file of this patent

UNITED STATES PATENTS

| | | |
|---|---|---|
| 566,625 | Savorgnan | Aug. 25, 1896 |
| 1,518,890 | Aikman | Dec. 9, 1924 |
| 1,749,144 | Lentz | Mar. 4, 1930 |
| 1,989,986 | Hudelson | Feb. 5, 1935 |
| 2,016,580 | Schulze et al. | Oct. 8, 1935 |
| 2,108,854 | Goff | Feb. 22, 1938 |
| 2,257,798 | Hill et al. | Oct. 7, 1941 |
| 2,281,146 | Fayman | Apr. 28, 1942 |
| 2,304,066 | Abell | Dec. 8, 1942 |
| 2,733,667 | Hill | Feb. 7, 1956 |
| 2,829,657 | Bender | Apr. 8, 1958 |
| 2,895,450 | Hope | July 15, 1959 |

FOREIGN PATENTS

| | | |
|---|---|---|
| 106,019 | Austria | Mar. 25, 1927 |
| 584,032 | Great Britain | Jan. 6, 1947 |
| 160,119 | Sweden | Aug. 20, 1957 |

UNITED STATES PATENT OFFICE
CERTIFICATE OF CORRECTION

Patent No. 3,008,451                               November 14, 1961

Paul N. Curry

It is hereby certified that error appears in the above numbered patent requiring correction and that the said Letters Patent should read as corrected below.

Column 2, line 6, for "non-absorbent rubbers" read -- non-absorbent sponge rubbers --.

Signed and sealed this 10th day of April 1962.

(SEAL)
Attest:

ERNEST W. SWIDER

Attesting Officer

DAVID L. LADD

Commissioner of Patents